(12) United States Patent
Gottlieb et al.

(10) Patent No.: US 10,885,547 B1
(45) Date of Patent: Jan. 5, 2021

(54) MONITORING EFFECTIVENESS OF ADVERTISEMENT PLACEMENT

(71) Applicants: Joseph Gottlieb, Brooklyn, NY (US); Tziporah Nussencweig, Brooklyn, NY (US)

(72) Inventors: Joseph Gottlieb, Brooklyn, NY (US); Tziporah Nussencweig, Brooklyn, NY (US)

(*) Notice: Subject to any disclaimer, the term of this patent is extended or adjusted under 35 U.S.C. 154(b) by 0 days.

(21) Appl. No.: 16/806,968

(22) Filed: Mar. 2, 2020

(51) Int. Cl.
*G06Q 30/02* (2012.01)
*G06K 9/00* (2006.01)
*G06T 7/70* (2017.01)

(52) U.S. Cl.
CPC ..... *G06Q 30/0246* (2013.01); *G06K 9/00255* (2013.01); *G06K 9/00778* (2013.01); *G06T 7/70* (2017.01); *G06T 2207/10016* (2013.01); *G06T 2207/30201* (2013.01)

(58) Field of Classification Search
CPC ........... G06Q 30/0246; G06K 9/00255; G06K 9/00778; G06T 7/70; G06T 2207/30201; G06T 2207/10016
See application file for complete search history.

(56) References Cited

U.S. PATENT DOCUMENTS

| | | | |
|---|---|---|---|
| 2018/0205550 A1* | 7/2018 | Appleyard | G09C 5/00 |
| 2019/0108551 A1* | 4/2019 | Chow | G06F 16/784 |
| 2019/0286889 A1* | 9/2019 | DeCovnick | G06K 9/00302 |

* cited by examiner

*Primary Examiner* — Joseph W Becker
(74) *Attorney, Agent, or Firm* — Israel Nissenbaum; Yitzy Nissenbaum

(57) ABSTRACT

A method and system for presenting an advertisement and determining site placement effectiveness of a visual display of an advertisement. A facial scanner is positioned relative to the visual display with a coverage range of the viewing area in front of and peripheral to the visual display. A server to which the scanner is coupled has controlling facial recognition software to identify and track unique recognized faces, A synchronization and timer mechanism configured to synchronize a visual display of a specific advertisement with captured scanned facial recognition of the unique recognized faces and the time that a specifically face is within the viewing area including interrupted time.

14 Claims, 1 Drawing Sheet

MONITORING EFFECTIVENESS OF ADVERTISEMENT PLACEMENT

FIELD OF THE INVENTION

This invention relates to the monitoring of the effectiveness of advertisement placement and particularly the attention that specific video advertisements generate, particularly with respect to shoppers and potential customers.

BACKGROUND

Determination of advertisement effectiveness is of vital importance in the enhancement of marketing particularly of a local nature such as in brick and mortar stores. Proper and effective allocation of advertising resources is a vital concern. This is particularly true with respect to video advertisement positioning to capture maximal attention and the amount of interest generated by such an advertisement. Various expedients have been utilized in this regard, the majority of which entail measurements of foot traffic in the vicinity of a displayed advertisement. This is somewhat akin to the famous "Nielson Ratings" which are determinative of television program viewers and "viewing traffic" used commonly in setting advertising rates. Of vital commercial interest is also the general effectiveness of a message conveyed by a video presentation. Direct observation of foot traffic and potential customers is an ideal expedient but difficult to achieve and maintain. In addition, simple foot traffic measurements are deficient in providing an insight into actual effectiveness of advertisements. In this respect, questionnaires are often utilized but the effectiveness thereof is dependent on the willingness of customers to take time to answer and sometimes the veracity of the respondents may be called into question.

SUMMARY

It is accordingly an object of the invention to provide an objective and automated system and method to monitor and evaluate foot traffic interest in placement of the advertisements and particularly video presentations/cum advertisements and the extent of interest generated by the presentations.

It is a further object to use the evaluated interest information in placement of advertisements most effectively at specific sites such as in stores or in specific stores.

It is still another object of the invention to provide an insight into actual consumer interest in advertisement content and presentation.

It is yet another object to utilize facial recognition software to determine the number of people looking at an advertisement (usually within a time range) and the time spent by individual people in looking at the advertisement. Facial recognition, as used herein is specifically not a personal identification and is without the engendering of privacy issues It is understood that an advertisement's effectiveness is evaluated by the number of people who look at an advertisement presentation specifically coupled with the amount of time a specific person lingers at watching the presentation.

Generally the present invention comprises a system and method for displaying or presenting an advertisement and determining site placement effectiveness. The system comprises:

a) a visual display of an advertisement;
b) a scanner positioned relative to the visual display with a coverage range of the viewing area in front of and peripheral to the visual display;
c) a server to which the scanner is coupled having controlling facial recognition software but not image capture and configured to label unique recognized faces; and
d) a synchronization and timer mechanism configured to synchronize a visual display of a specific advertisement with captured scanned unique faces (not necessary with a static display) and the time that a specifically captured unique face is within the viewing area including interrupted time (i.e, returning viewing).

The visual display is, most commonly, a screen on which an advertisement is presented and even includes a static display. A camera or video scanner is positioned relative to the display or screen with a coverage range of the viewing area in front of and peripheral to the screen. The camera or video scanner is coupled to a computer or server with controlling facial recognition software instead of image capture. When a face (with characteristic facial features) is detected within the viewing area, the system registers the face as a viewer (without an actual photograph or viewer identification being taken or ascertained) and counted as a viewer of the advertisement. The system also registers how long a particular registered face lingers in front of the advertisement and any time of a returning viewer.

The system keeps a tally of the number of individual viewers and the time spent by each in the viewing area in real time or time correlated storage. If the advertisement is not on constant display or if the display is of numerous and different advertisements, the system is set to record the times a specific advertisement is presented and to correlate it to viewer tallies with a synchronization mechanism.

As an optional feature the system is programmed to display advertisements germane to a particular store's merchandise such advertisements for drugs in a pharmacy, appliances in a department store, electronics in a computer center and the like.

The method for determining advertising effectiveness comprises the steps of:

a) setting up an advertising display such as with a display screen; camera or video scanner with correlated computer or server controlled facial recognition;
b) scanning and recognizing faces viewing the advertising and keeping a running tally of recognized faces;
c) using the facial recognition software to determine length of time of a particular face viewing the advertisement (including return viewing);
d) correlating the tally of viewing faces and duration of viewing to the particular advertisement being displayed; and
e) using the correlated data to determine the most effective use and position of advertising displays and optionally the effectiveness of the advertisement presentation itself.

These and other objects, features and advantages of the present invention will become evident from the following discussion and appended drawings in which:

SHORT DESCRIPTION OF THE DRAWINGS

DETAILED DESCRIPTION

Figure 1:
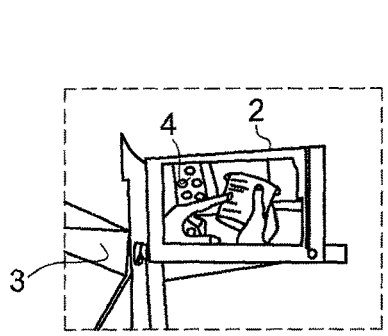
FIG. 1 shows a screen with an advertisement displayed thereon.

The components of the system include an advertisement presentation device with elements for storage of displayable advertisements and display thereof on a display element such as a video screen; and a timer-synchronization element for timing and tracking advertisement display with synchronization with connection to a server or controller element. FIG. 1 depicts a store section 1 with a video screen 2 supported at a readily visible level at the end of product shelf 3. An advertisement 4 is shown as being played thereon for viewing by passing shoppers.

Figure 2:
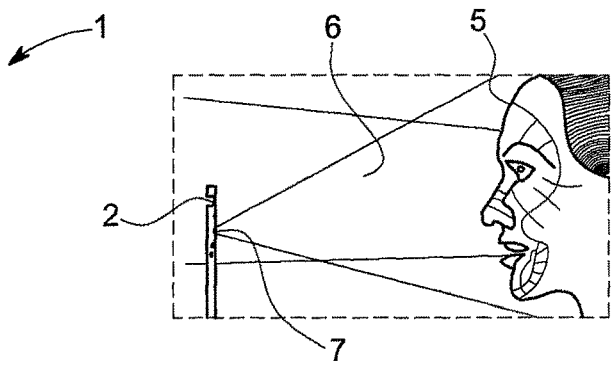
FIG. 2 depicts facial recognition being used to scan a viewer for viewing interest.

The timer-synchronization element within video screen 2 and or coupled computer or server (not shown) is linked to a camera-scanner which faces away from the presentation device for scanning of human faces within vision range of the presentation device display element. FIG. 2, shows the video screen 2 being viewed by a face 5 which is in turn subjected to visual facial scanning 6 by camera/scanner 7. The camera/scanner has a vertical height scanning range within four to seven feet from the adjacent ground or within a range deemed sufficient to capture faces looking at the screen. Lateral and distance ranges are dependent on size and viewability of the display screens (larger screens are more laterally or distantly comprehendingly visible than smaller screens). Because of the possible variability of ranges, the primary factor is that of a range of distance and lateral positioning amenable for viewing of a displayed advertisement with sufficient visibility for comprehension.

A component of the present system is an advertisement presentation device with advertisements either initially loaded, or progressively loaded thereon by a connected source and displayed on a display screen viewable by the shopping public. The presentation device is further provided with a timer synchronization element with which the advertisements are timed and synchronized with a viewer detection device. Advertisement presentations are thereby correlated with viewers for determining various parameter of interest.

In an embodiment, the presentation device is preloaded or provided with advertisements for presentations in timed "playlists". In such embodiment, each device has a factory unique device id, and username, given by an administrator, when initially activating the device. An application automatically starts in the device, after initial registration with a server, with the device having been registered to the server. Activation is effected via an administration panel, with group and playlists being assigned to play video.

The administrator, in such embodiment, is able to control the device, and perform the following from a device control list, such as Stop Application, Control Audio Volume, restart apps and the like. The administrator may also be able to monitor the status of each device such as "Playing", "Not Playing" "last updated" etc. Other optional and desirable features include the administrator being able to assign a single device or multiple device a Group, or individually. The Administrator may also be able to assign a Playlist or single video file to a single device or Group of devices.

Once a playlist is assigned to the device, the device is able to synchronize the playlist and/or video file with Server Data and to play video designated by the server settings for this device. As soon as the device and server are connected and identified, the presentation device begins downloading video(s) and the order of priority to device memory. The device begins playing before it completes full download of files/playlist. Once a download is complete it is then able to play from its own memory.

The device keeps checking-in with the server in short intervals such as every 20 seconds, for new instructions. If it detects any updates/changes, then it will change in local SQLite (relational database management system) database and delete existing file(s) from the local server and to download new files from the server and begin the cycle anew. When the video with advertisements begins playing, the camera/scanner function activates and remains active in background while the video is playing in the device.

While a video is playing and a human face is detected by the camera/scanner within the viewing range, the system saves the "face" with a temporary name, and a counter counts how may faces are detected while a specific video was playing. As used herein, "face" represents identifying characteristics as a unique viewer rather than actual images. Once the face is detected, named and saved, duration of the specific face detection is calculated and saved, thereby establishing how much time each viewer spent looking at the video advertisement.

Once the device begins playing a video file, the device sends a report to the server with details of the file currently playing and resets the face counter. When playing of the video file is complete, a final report is sent to the server with details of the number of viewer(s) and the process continues to the next video with the same activity cycle.

After each video file is played and the face count is updated in the database, face detection information is deleted, to absolutely protect privacy, even though it does not include actual images.

In accordance with the invention, face detection is defined herein as the process of automatically locating human faces (having specific shape parameters) in visual media (digital images or video). A face that is detected within an established viewing range is reported to be at a position, with an associated size and orientation. Once a face is detected, it can be searched for unique identifying landmarks such as the eyes and nose to be provided with a unique temporary name for specific monitoring.

As a further step, face or facial recognition automatically determines if two faces are likely to correspond to the same person. Face tracking extends face detection to video sequences. Any face appearing in a video for any length of time can be tracked. That is, faces that are detected in consecutive video frames can be identified as being the same person. Face tracking is however not a form of face recognition but is a mechanism that just makes inferences based on the position and motion of the face(s) in a video sequence.

A landmark is a point of interest within a face. The left eye, right eye, and nose base are all common examples of landmarks. Classification is determining whether a certain facial characteristic is present. For example, a face can be classified with regards whether its eyes are open or closed. Another example is whether the face is smiling or not.

Figure 3:
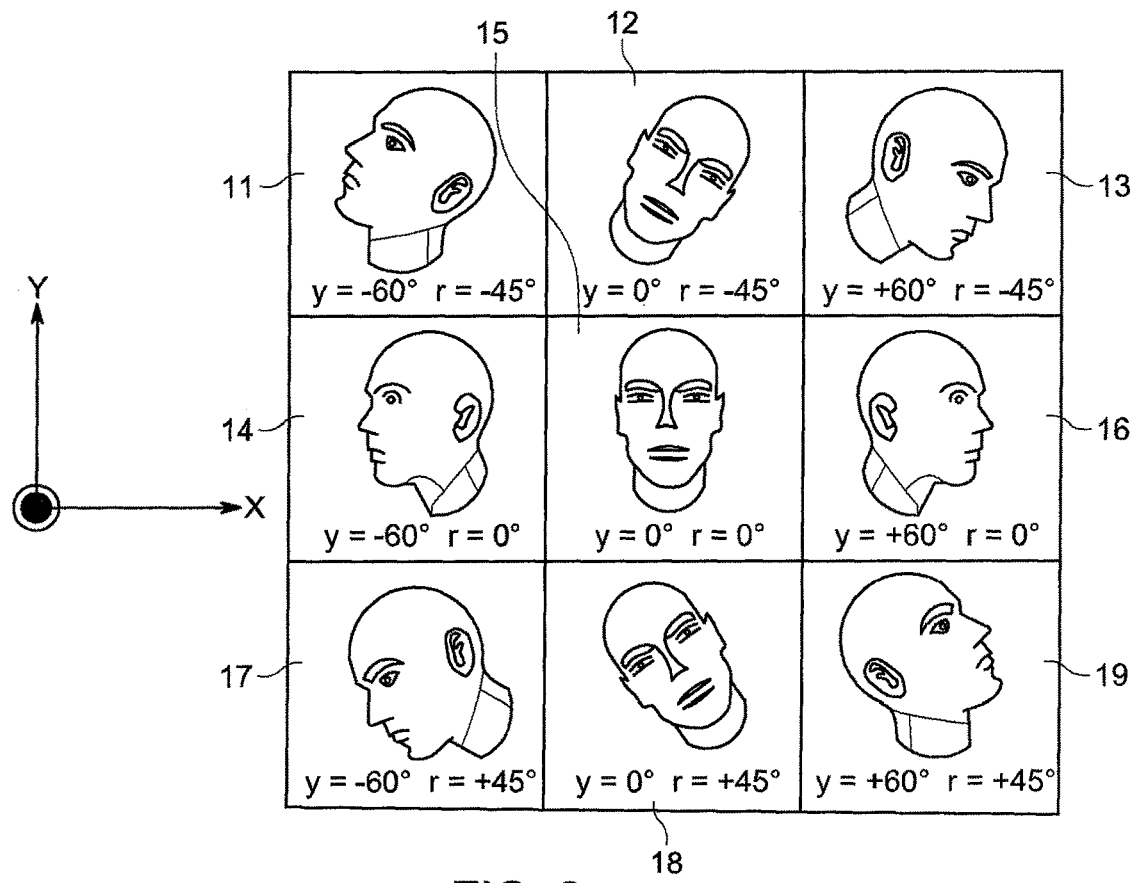
FIG. 3 is a visual table of nine facial recognition orientation angles applicable with facial scanning herein.

A face API (application programming interface) detects faces at a range of different angles, as illustrated in FIG. 3. Pose angle estimation. (a) The coordinate system with the image in the XY plane and the Z axis coming out of the figure. (b) Pose angle examples where y=Euler Y, r=Euler Z. The nine face examples 11-19 illustrate y values of −60° (11, 14 and 17), 0° (12, 15 and 18), and +60° (13, 16 and 19) and corresponding r values of −45°, 0° and +45° with angular face orientations.

The Euler X, Euler Y, and Euler Z angles characterize a face's orientation as shown in FIG. 3. The Face API provides measurement of Euler Y and Euler Z (but not Euler X) for detected faces. The Euler Z angle of the face is always reported. The Euler Y angle is available only when using the "accurate" mode setting of the face detector (as opposed to the "fast" mode setting, which takes some shortcuts to make detection faster). Euler X is not currently available but it is not required for the viewer face identifications required herein in a two dimensional manner.

Figure 4:
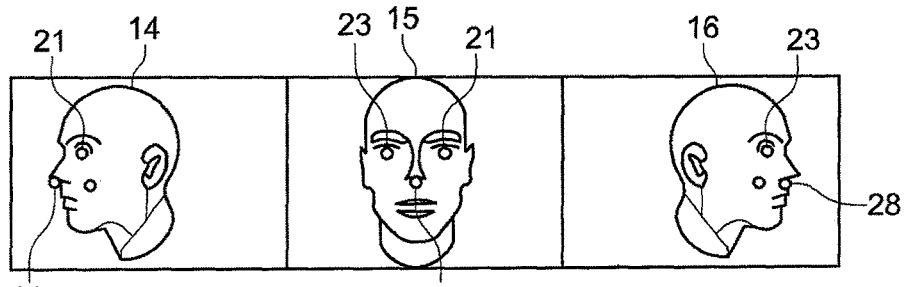
FIG. 4 is a visual table with three face positions showing various examples of facial recognition landmarks for use in identifying a viewer without an image.

A landmark is a point of interest within a face and is used to provide unique identifiers for establishing a particular viewer. FIG. 4 shows some examples of landmarks of the left eye 21, right eye 23, and nose base 28 are all examples of landmarks.

Rather than first detecting landmarks and using the landmarks as a basis of detecting the whole face, the Face API detects the whole face independently of detailed landmark information. For this reason, landmark detection is an optional step that could be done after the face is detected. Landmark detection is not done by default, since it takes additional time to run. As an optional feature it is possible to specify that landmark detection should be done.

The following table summarizes many of the landmarks that can be detected, for an associated face Euler Y angle:

TABLE

| Euler Y angle | Detectable landmarks |
| --- | --- |
| <−36° | left eye, left mouth, left ear, nose base, left cheek |
| −36° to −12° | left mouth, nose base, bottom mouth, right eye, left eye, left cheek, left ear tip |
| −12° to 12° | right eye, left eye, nose base, left cheek, right cheek, left mouth, right mouth, bottom mouth |
| 12° to 36° | right mouth, nose base, bottom mouth, left eye, right eye, right cheek, right ear tip |
| >36° | right eye, right mouth, right ear, nose base, right cheek |

Each detected landmark includes its associated position in the image. Classification determines whether a certain facial characteristic is present. The Android Face API currently supports two classifications: eyes open and smiling. Classification is expressed as a certainty value, indicating the confidence that the facial characteristic is present. For example, a value of 0.7 or more for the smiling classification indicates that it is likely that a person is smiling.

Both of these classifications rely upon landmark detection.

The features of "eyes open" and "smiling" classification only works for frontal faces, that is, faces with a small Euler Y angle (at most about +/−18 degrees).

Once the details of viewers and viewer interest is derived from number of viewers and viewer interest in particular advertisements displayed in particular locations it is possible to assess effectiveness of display location and of advertisement content for the appropriate commercial adjustments.

It is understood that the above description with examples and features is illustrative of the invention and that changes in elements and functions as well as parameters of display, scanning, synchronization and timing, facial recognition and cognitive functions and identification is possible without departing from the scope of the invention as defined in the following claims.

What is claimed is:

1. A system for presenting an advertisement and determining site placement effectiveness comprising:
    a) An initial visual display of an advertisement;
    b) a face scanner positioned relative to the visual display with a coverage range of the viewing area in front of and peripheral to the visual display;
    c) a server to which the scanner is coupled having controlling facial recognition software configured to identify and label unique recognized faces only viewing an already displayed advertisement, wherein the facial recognition software is configured without image capture or specific facial identity;
    d) a synchronization and timer mechanism configured to synchronize a visual display of a specific advertisement with captured scanned and labeled unique recognized faces and the time that a specifically captured face is within the viewing area including interrupted time and
    wherein while a video advertisement is playing and a human face is detected by the face scanner within the viewing range, the system is configured to save the face with a temporary name, and a counter counts how may faces are detected while a specific video was playing,
    wherein once the face is detected, named and saved, the system is configured to calculate duration and save the specific face detection, thereby establishing how much time each viewer spent looking at the video advertisement, and
    wherein after a face count is made and updated in a database, the system is configured to delete face detection, to absolutely protect privacy, even though it does not include actual images.

2. The system of claim 1, wherein the facial recognition software is configured to be effected with scanned detection of pre-determined facial landmarks as correlated to selected Euler based facial positional angles on a coordinate system with an X, Y plane and Z axis.

3. The system of claim 1, wherein the server is configured to keep a tally of the number of individual viewers and the time spent by each in the viewing area in one of real time or time correlated storage.

4. The system of claim 1, wherein if a displayed advertisement is not on constant display or if the display is of numerous and different advertisements, the synchronization and timer mechanism tracks the times a specific advertisement is presented and correlates it to viewer tallies.

5. The system of claim 1, wherein the visual display is programmed to display advertisements germane to a particular store's merchandise.

6. The system of claim 1, wherein the face scanner is positioned to have a vertical height scanning range within four to seven feet from an adjacent ground level.

7. The system of claim 1, wherein the video display is provided with advertisements for presentations in timed playlists, wherein each video display has a factory unique device id, and username and wherein a display automatically starts in the video display, after initial registration of the video display with the server.

8. The system of claim 1, wherein facial recognition comprises automatically locating human faces having specific shape parameters in visual media and when a face is detected within an established viewing range, it is reported to be at a position, with an associated size and orientation and whereby once a face is detected, it is searched for unique identifying landmarks to be provide a unique temporary name for specific monitoring.

9. The system of claim 8, wherein face recognition is configured to automatically determine if two faces are likely to correspond to the same person, and wherein face recognition tracking is configured to extend face detection to video sequences wherein, faces that are detected in consecutive video frames are be identified as being the same person.

10. The system of claim 2, wherein a landmark is a point of interest within a face comprising the left eye, right eye, and nose base and wherein the facial recognition software is configured with classification is determining whether a certain facial characteristic is present.

11. The system of claim 10 wherein, a face is classified with regards to whether its eyes are open or closed and whether the face is smiling or not.

12. The system of claim 2, wherein the system comprises a face API (application programming interface) configured to detect faces at a range of different angles, with pose angle estimation in the coordinate system with the image in the X, Y plane and the Z axis coming out of the figure and with pose angle y values of −60° 0° and +60° and corresponding r values of −45°, 0° and +45° with angular face orientations.

13. The system of claim 12, wherein the API comprises the following Euler Y angle and corresponding detectable facial landmarks:

| Euler Y angle | Detectable landmarks |
| --- | --- |
| <−36° | left eye, left mouth, left ear, nose base, left cheek |
| −36° to −12° | left mouth, nose base, bottom mouth, right eye, left eye, left cheek, left ear tip |
| −12° to 12° | right eye, left eye, nose base, left cheek, right cheek, left mouth, right mouth, bottom mouth |
| 12° to 36° | right mouth, nose base, bottom mouth, left eye, right eye, right cheek, right ear tip |
| >36° | right eye, right mouth, right ear, nose base, right cheek. |

14. A method for determining advertising effectiveness comprises the steps of:
   a) setting up an advertising display camera or video scanner with correlated computer or server controlled facial recognition in location of interest;
   b) scanning and recognizing faces viewing the advertising and keeping a running tally of recognized faces;
   c) using the facial recognition software to determine length of time of a particular recognized face viewing the advertisement including return viewing, wherein the facial recognition software is configured without image capture or specific facial identity;
   d) correlating the tally of viewing faces and duration of viewing by the viewing faces to the particular advertisement being displayed;
   e) using the correlated data to determine the most effective use and position of advertising displays and optionally the effectiveness of the advertisement presentation itself, and
   wherein while a video advertisement is playing and a human face is detected by the face scanner within the viewing range, the system is configured to save the face with a temporary name, and a counter counts how may faces are detected while a specific video was playing,
   wherein once the face is detected, named and saved, the system is configured to calculate duration and save the specific face detection, thereby establishing how much time each viewer spent looking at the video advertisement, and
   wherein after a face count is made and updated in a database, the system is configured to delete face detection, to absolutely protect privacy, even though it does not include actual images.

* * * * *